United States Patent
Dingman

(10) Patent No.: US 9,193,321 B2
(45) Date of Patent: Nov. 24, 2015

(54) MULTI-AXIS VEHICLE SENSOR MOUNTING

(71) Applicant: Continental Automotive Systems, Inc., Auburn Hills, MI (US)

(72) Inventor: Michael A. Dingman, Davison, MI (US)

(73) Assignee: Continental Automotive Systems, Inc., Auburn Hills, MI (US)

( * ) Notice: Subject to any disclaimer, the term of this patent is extended or adjusted under 35 U.S.C. 154(b) by 0 days.

(21) Appl. No.: 14/308,833

(22) Filed: Jun. 19, 2014

(65) Prior Publication Data
US 2014/0379221 A1    Dec. 25, 2014

Related U.S. Application Data

(60) Provisional application No. 61/837,837, filed on Jun. 21, 2013.

(51) Int. Cl.
| | |
|---|---|
| *B60R 21/0136* | (2006.01) |
| *B60R 21/013* | (2006.01) |
| *B60R 21/0132* | (2006.01) |
| *B60R 21/01* | (2006.01) |

(52) U.S. Cl.
CPC ........... *B60R 21/013* (2013.01); *B60R 21/0132* (2013.01); *B60R 21/0136* (2013.01); *B60R 2021/01013* (2013.01); *B60R 2021/01286* (2013.01)

(58) Field of Classification Search
USPC ..................... 701/45–46, 301, 33.7; 180/271; 280/735; 307/10.1; 340/436
See application file for complete search history.

(56) References Cited

U.S. PATENT DOCUMENTS

| | | | | |
|---|---|---|---|---|
| 6,421,592 | B1 * | 7/2002 | Bargman et al. ................. | 701/45 |
| 6,424,897 | B1 * | 7/2002 | Mattes et al. ................... | 701/45 |
| 6,487,482 | B1 * | 11/2002 | Mattes et al. ................... | 701/45 |
| 6,766,234 | B2 * | 7/2004 | Takagi et al. ................... | 701/45 |

(Continued)

FOREIGN PATENT DOCUMENTS

| | | | | |
|---|---|---|---|---|
| DE | 10151376 A1 | 4/2002 | | |
| DE | 010200424 A1 * | 7/2003 | ............. | G08G 1/042 |

(Continued)

OTHER PUBLICATIONS

Precise position and speed detection from slit camera image of road surface marks; Kawamata, S. ; Ito, N. ; Katahara, S. ; Aoki, M. Intelligent Vehicle Symposium, 2002. IEEE; vol. 1; DOI: 10.1109/IVS.2002.1187934; Publication Year: 2002 , pp. 92-97 vol. 1.*

(Continued)

*Primary Examiner* — Cuong H Nguyen

(57) ABSTRACT

A disclosed safety system for a vehicle is discloses and includes at least one sensor for sensing movement and forces on the vehicle indicative of an impact along a first sensing axis parallel with a longitudinal axis of the vehicle and a second sensing axis angled relative to a lateral axis of the vehicle. An electronic control unit is in communication with the at least one sensor and derives movement and force along the different axes from the information obtained relative to movement and forces along the second sensing axis. The electronic control unit uses the derived information to determine if a safety response is required based upon movement sensed by the at least one sensor and the information derived from information relating to movement along the second sensing axis.

13 Claims, 2 Drawing Sheets

(56) References Cited

U.S. PATENT DOCUMENTS

| | | | | |
|---|---|---|---|---|
| 6,916,997 | B2* | 7/2005 | Thakur | G01G 19/4142 177/136 |
| 6,989,496 | B2* | 1/2006 | Desrochers | G01G 19/4142 177/144 |
| 7,463,987 | B2* | 12/2008 | Cech | B60R 21/0136 280/734 |
| 7,922,196 | B2* | 4/2011 | Le et al. | 280/735 |
| 8,242,392 | B1* | 8/2012 | Ondracek | 200/61.45 R |
| 8,244,437 | B2* | 8/2012 | Le | B60R 21/0134 280/735 |
| 8,374,751 | B2* | 2/2013 | Katz | B60R 21/0136 180/274 |
| 8,660,756 | B2* | 2/2014 | Schrader | 701/45 |
| 2002/0165654 | A1* | 11/2002 | Weaver et al. | 701/45 |
| 2003/0102178 | A1 | 6/2003 | Ide et al. | |
| 2003/0114973 | A1* | 6/2003 | Takagi et al. | 701/45 |
| 2009/0306857 | A1* | 12/2009 | Katz | B60R 21/0136 701/45 |
| 2011/0202241 | A1* | 8/2011 | Le | B60R 21/0134 701/46 |
| 2012/0191374 | A1* | 7/2012 | Soles et al. | 702/36 |

FOREIGN PATENT DOCUMENTS

| | | | | |
|---|---|---|---|---|
| DE | 102010050930 B4 * | 10/2014 | | B66F 3/25 |
| EP | 1559616 A1 | 8/2005 | | |
| EP | 2664945 B1 * | 7/2015 | | G01V 1/16 |
| KR | 2012041555 A * | 5/2012 | | B60K 5/04 |
| TW | 477780 B1 * | 3/2015 | | G01P 2015/0837 |
| WO | PCT/DE03/01798 | * | 11/2005 | |
| WO | PCT/DE03/03499 | * | 8/2006 | |
| WO | PCT/DE04/01475 | * | 4/2007 | |

OTHER PUBLICATIONS

The system development of unmanned vehicle for the teleoperated system interfaced with driving simulator; Duk-Sun Yun ; Jae-Heung Shim ; Min-Seok Kim ; Young-Hoon Park ; Jung-Ha Kim; Robotics and Automation, 2001. Proceedings 2001 ICRA. IEEE International Conference on; vol. 1; DOI: 10.1109/ROBOT.2001.932630; Publication Year: 2001 , pp. 68.*

Lane tracking control in vehicle-following collision situations; Ching-Yao Chan ; Han-Shue Tan; American Control Conference, 1999. Proceedings of the 1999; vol. 5; DOI: 10.1109/ACC.1999. 782456; Publication Year: 1999 , pp. 3697-3701 vol. 5.*

Estimation of tire-road friction coefficient and frictional force for Active Vehicle safety system; Chakraborty, S.; Sen, S.; Sutradhar, A.; Sengupta, A.; Industrial Instrumentation and Control (ICIC), 2015 International Conference on; Year: 2015; pp. 674-679, DOI: 10.1109/ IIC.2015.7150827.*

Integrated estimation of vehicle states, tire forces, and tire-road friction coefficients; Tesheng Hsiao; Jing-Yuan Lan; Hanping Yang Control, Automation and Systems (ICCAS), 2014 14th International Conference on; Year: 2014; pp. 1227-1232, DOI: 10.1109/ICCAS. 2014.6987744.*

Instantaneous full-motion estimation of arbitrary objects using dual Doppler radar; Kellner, D.; Barjenbruch, M.; Klappstein, J.; Dickmann, J.; Dietmayer, K.; Intelligent Vehicles Symposium Proceedings, 2014 IEEE; Year: 2014; pp. 324-329, DOI: 10.1109/IVS. 2014.6856449.*

Vehicle State Estimation Using Cubature Kalman Filter; Xiaoshuai Xin; Jinxi Chen; Jianxiao Zou; Computational Science and Engineering (CSE), 2014 IEEE 17th International Conference on; Year: 2014; pp. 44-48, DOI: 10.1109/CSE.2014.42.*

PCT/US2014/043333 International Search Report and the Written Opinion of the International Searching Authority dated Sep. 25, 2014.

* cited by examiner

MULTI-AXIS VEHICLE SENSOR MOUNTING

CROSS REFERENCE TO RELATED APPLICATION

This application claims priority to U.S. Provisional Application No. 61/837,837 filed Jun. 21, 2013.

BACKGROUND

Vehicle safety systems, including airbag deployment systems, utilize sensors located on the vehicle to detect crash situations. The crash sensors communicate with an electronic control unit (ECU) that makes decisions on when to deploy safety devices such as an airbag. Information used by safety systems includes direction and force of an impact. Sensors must be arranged to sense data along each axis a vehicle to determine the direction from which an impact occurs. Therefore, multiple sensors are utilized throughout the vehicle to detect force and movement indicative of an impact that is utilized by the safety system.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

A disclosed safety system for a vehicle includes at least one sensor for sensing movement and forces on the vehicle indicative of an impact along a first sensing axis parallel with a longitudinal axis of the vehicle and a second sensing axis angled relative to a lateral axis of the vehicle. The at least one sensor includes first and second sensor portions that enable sensing movement and force in two directions perpendicular to each other. The sensors are oriented such that the second sensing axis is disposed at an angle greater than 0 and less than 90 degrees relative to the vehicle lateral axis. In one disclosed embodiment the angle of the second sensing axis is 45 degrees.

An electronic control unit is in communication with the at least one sensor and derives movement and force along the different axes from the information obtained relative to movement and forces along the second sensing axis. The ECU uses the derived information to determine if a safety response is required based upon movement sensed by the at least one sensor and the information derived from information relating to movement along the second sensing axis.

Although the different examples have the specific components shown in the illustrations, embodiments of this disclosure are not limited to those particular combinations. It is possible to use some of the components or features from one of the examples in combination with features or components from another one of the examples.

These and other features disclosed herein can be best understood from the following specification and drawings, the following of which is a brief description.

DETAILED DESCRIPTION

Figure 1:
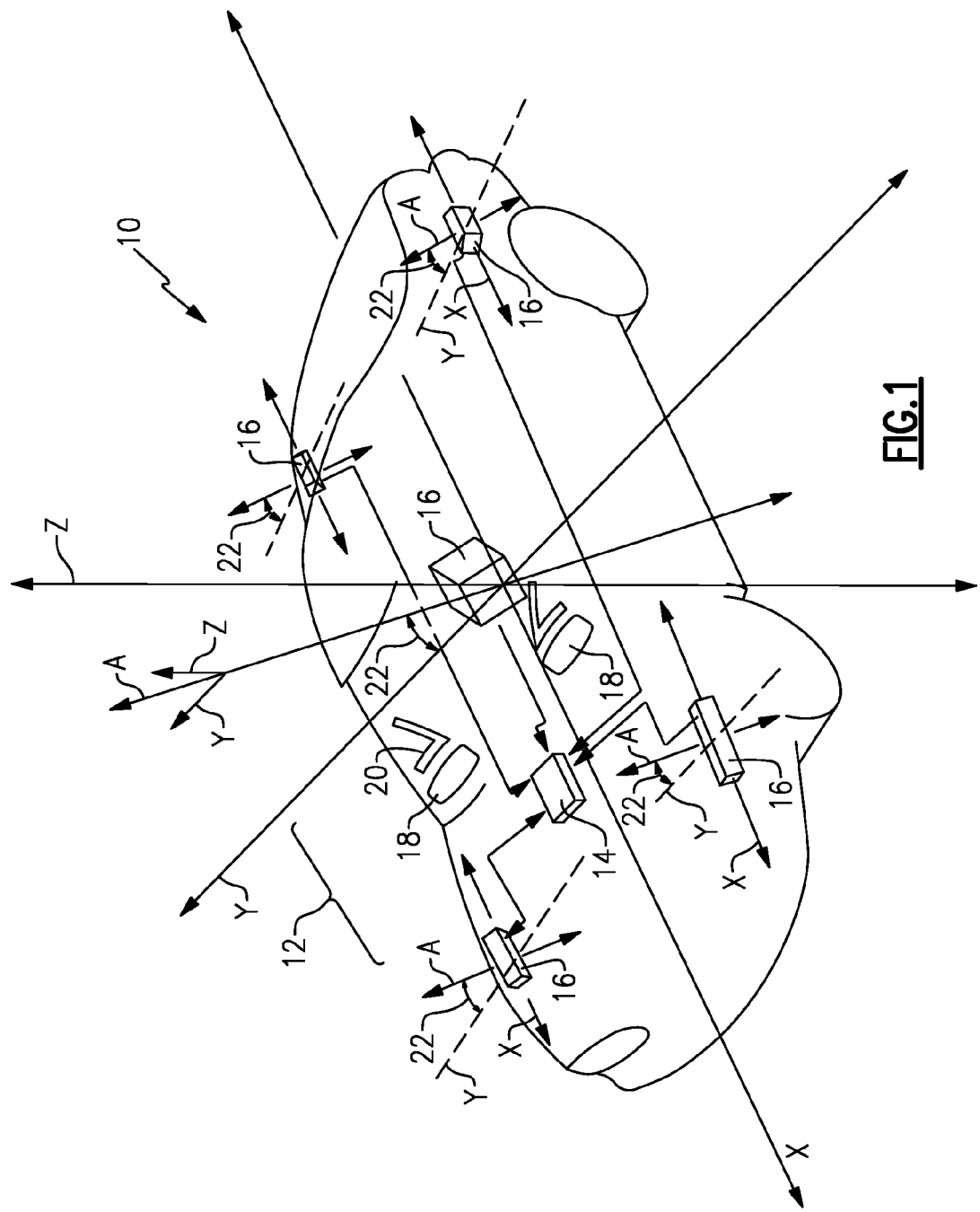
FIG. 1 is a schematic view of an example vehicle including a safety system.

The following description is merely exemplary in nature and is in no way intended to limit the disclosure, its application, or uses. For purposes of clarity, the same reference numbers will be used in the drawings to identify similar elements.

Referring to FIG. 1, a vehicle 10 includes a safety system 12 with supplemental restraints such as airbags 18 and active seatbelts 20. The safety system 12 includes an electronic control unit (ECU) 14 and at least one sensor 16 mounted to the vehicle 10. In this example, at least four (4) sensors 16 are mounted throughout the vehicle 10 and generate signals indicative of movement and force along one of several vehicle axes. The ECU 14 uses data from the sensor(s) 16 to determine if an impact has occurred. Upon determining that an impact has occurred, the ECU 14 generates a signal to initiate a safety response and deploy at least one safety measure, such as the airbags 18 and the active seatbelts 20. The ECU 14 may deploy a combination of safety measures such as multiple airbags 18, restraint tensioning of the seatbelts 20, etc depending on the detected direction and magnitude indicated by signals from the sensors 16.

Impact and movement of the vehicle 10 will occur in directions that includes components of several major vehicle axes. In this example, an X axis is disposed along the longitudinal axis of the vehicle, a Y axis is disposed along a lateral axis and a Z axis or third axis is perpendicular to both the Y axis and the X axis. Each of the sensors 16 generates information indicative of movement parallel to each of the vehicle axes and communicates that information to the ECU 14.

Figure 2:
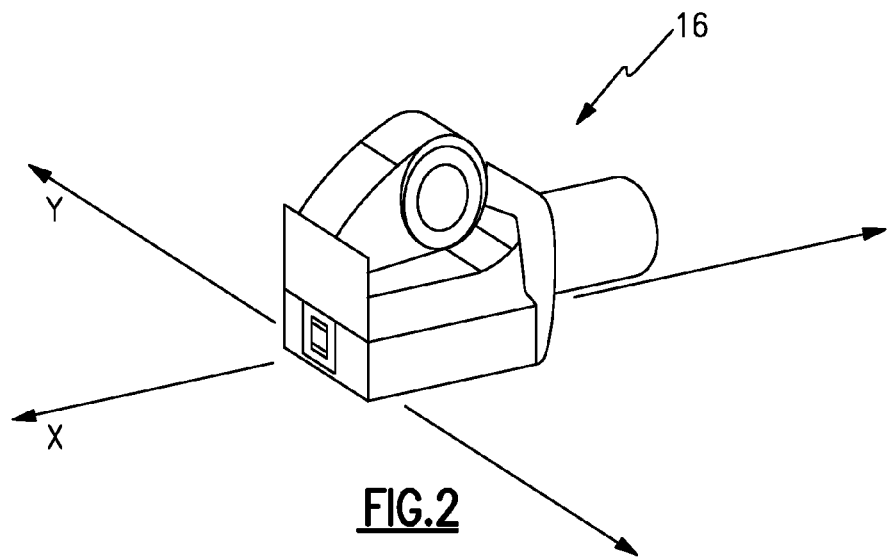
FIG. 2 is a perspective view of one of the several sensors of the safety system.
Figure 3:
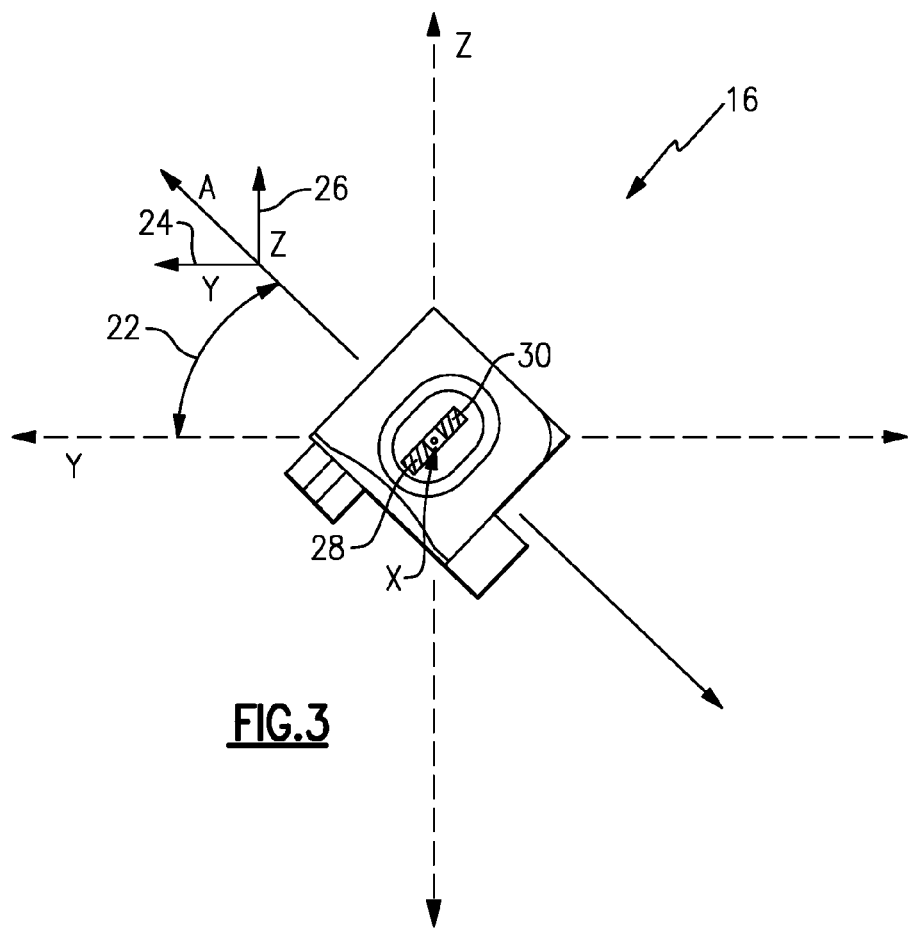
FIG. 3 is a schematic view of the sensing axes of an example sensor.

Referring to FIGS. 2 and 3 with continued reference to FIG. 1, the example sensor(s) 16 each sense in two sensing directions, perpendicular to each other and are referred to as XY sensors. In this example, each of the sensors 16 include a first sensing portion 28 that senses movement and force in the first sensing direction and a second sensing portion 30 that senses movement and force in the second sensing direction. Sensing in only two (2) directions, such as for example the X axis and the Y axis, leaves movement about the Z axis potentially undetected, or could delay detection. Accordingly, the example safety system 12 utilizes sensors 16 that sense movement along two (2) axes to obtain information relating to movement along at least three (3) axes by angling each of the sensors 16 such that a first sensing axis is disposed parallel with the X axis and a second sensing axis A is disposed at an angle relative to the lateral or Y axis.

The angled orientation of the sensing axis A (FIG. 1 and FIG. 3) enables the two axis, XY sensor(s) 16 to generate information indicative of movement along all three axes. In this example, the sensor(s) 16 are orientated to sense movement along the second sensing axis A which is disposed at an angle of 45 degrees relative to the X axis. Although the example sensor (2) are mounted to provide the second sensing axis A at a 45 degree angle, any angle greater than 0 and less than 90 degrees could be utilized and is within the contemplation of this disclosure.

The example sensor(s) 16 are XY-sensor that are orientated by rotating the sensor 16 about a longitudinal axis parallel with the X axis such that instead of sensing movement along an axis perpendicular to the X axis, it senses movement about the second sensing axis A orientated at 45 degrees from the X axis. The sensor(s) 16 therefore senses 100% of the force and movement in a first sensing axis along the direction parallel with the longitudinal axis of the vehicle 10 and partially sense movement along each of the Y and Z axes according to a first component 24 and a second component 26. As appreciated, movement along the second sensing axis A includes both a Y component (the first component 24) and a Z component (the second component 26). The sensor (16) therefore senses a portion of movement in each direction. In this example, the sensor 16 will generate information indicative of a portion (71% for the example 45 degree angle) of force in a second direction along the Y-axis and also 71% of force in a third direction along the Z-axis. Accordingly, the two axes, XY sensor (16) provides information indicative of force and movement along three axes of the vehicle 10 without the added complexity and cost of a three axis sensor.

The ECU 14 receives the information from each of the sensors 16 indicative of movement along the two sensing axes and generates information indicative of movement in three axes of the vehicle 10. The generation of information along the second sensing axis A is utilized to derive movement and force values of the first component 24 in along the Y axis and the second component 26 along the Z axis in view of the angle 22. The ECU 14 then uses the derived information in combination with information obtained indicative of movement and force along the longitudinal axis of the vehicle from the sensors 16 to determine a direction and severity of an impact and generate signals to initiate deployment of any required elements of the safety system 12. Derivation of the components of movement and force is conducted by an algorithm programmed as part of the ECU 14.

In operation, each of the sensors 16 orientated throughout the vehicle 10 are orientated to detect movement and force along a first sensing axis parallel with a vehicle longitudinal axis X of the vehicle and a second sensing axis A that is angled relative to the vehicle lateral axis. The sensor 16 therefore generates a signal indicative of movement along the first and second sensing axes and communicates that information to the ECU 14. The ECU 14 use the information indicative of movement and force along the second sensing axis A to derive values indicative of movement and force about corresponding Y and Z axes of the vehicle 10. The ECU 14 then generates a signal triggering actuation of a safety response from the safety system 12 as required and previously defined.

In this example, movement and force sensed along the second sensing axis A includes the first component 24 indicative of movement along the vehicle lateral axis or Y axis and the second component 26 indicative of movement along the third vehicle axis transverse to the vehicle lateral axis and the vehicle longitudinal axis. The ECU 14 derives movement and force along the vehicle Y or lateral axis based on the first component 24 and movement and force along the third vehicle axis based on the second component 26. The ECU 14 then generate a signal to initiate the safety response based on movement sensed along the first sensor axis, the first component indicative of movement along the lateral axis and the second component indicative of movement along the third vehicle axis.

Safety systems utilizing three axis rollover sensors could be replaced with two axis sensors supported by an algorithm utilized in the ECU to generate information of movement and forces exerted on the vehicle in different directions and along at least three axes. An algorithm using the data obtained from the sensors 16 enables an understanding of the vehicle dynamic condition which could result in safety system deployment.

The additional information provided by orientating the sensor at angle such as 45 degrees enables better decision making for the time to deploy the airbag or other safety device. The 45 degree mounting orientation provides the simplest geometric calculation. However, there could be other angles selected between 0 and 90 degrees. Other angles would select one sense direction more than the other for situations where this would be desirable.

While the best modes for carrying out the invention have been described in detail the true scope of the disclosure should not be so limited, since those familiar with the art to which this invention relates will recognize various alternative designs and embodiments for practicing the invention within the scope of the appended claims.

Although an example embodiment has been disclosed, a worker of ordinary skill in this art would recognize that certain modifications would come within the scope of this disclosure. For that reason, the following claims should be studied to determine the scope and content of this disclosure.

What is claimed is:

1. A safety system for a vehicle comprising:
   at least one sensor configured to sense movement only along a first sensing axis and a second sensing axis normal to the first sensing axis, the at least one sensor sensing movement indicative of an impact along the first sensing axis parallel with a longitudinal axis of the vehicle and the second sensing axis angled relative to a lateral axis of the vehicle, wherein movement indicative of an impact along the second sensing axis includes a first component indicative of movement along the lateral axis and a second component indicative of movement along a third vehicle axis transverse to the vehicle lateral axis and the vehicle longitudinal axis; and
   an electronic control unit in communication with the at least one sensor to determine if a safety response is required based upon movement sensed by the at least one sensor.

2. The safety system as recited in claim 1, wherein the second sensing axis is greater than 0 degrees and less than 90 degrees from the lateral axis.

3. The safety system as recited in claim 1, wherein the second sensing axis is 45 degrees from the lateral axis.

4. A method of operating a vehicle safety system comprising:
   detecting a force in a direction of impact with sensor including only a first sensor portion and a second sensor portion, the first sensor portion for sensing movement along a first sensing axis and the second sensor portion for sensing along a second sensing axis normal to the first sensing axis, wherein the first sensor portion senses forces a force along a first sensing axis parallel with a longitudinal axis of the vehicle and second sensor portion senses forces along a second sensing axis angled relative to a lateral axis of the vehicle, wherein sensing movement indicative of an impact along the second sensing axis includes a first component indicative of movement along the lateral axis and a second component indicative of movement along a third vehicle axis transverse to the vehicle lateral axis and the vehicle longitudinal axis such that the sensor including only a first sensor portion and a second sensor portion detects forces along at least three vehicle axes;
   determining with an electronic control unit that a safety response is required based upon signals communicated from the sensor indicative of forces exerted on the vehicle; and
   generating a signal for triggering a safety response with the electronic control unit.

5. The safety system as recited in claim 1, wherein the electronic control unit determines movement along the lateral axis of the vehicle based on the first component and movement along the third vehicle axis based on the second component.

6. The safety system as recited in claim 5, wherein the electronic control unit generates a signal to initiate the safety response based on movement sensed along the first sensor axis, the first component indicative of movement along the lateral axis and the second component indicative of movement along the third vehicle axis.

7. The safety system as recited in claim 5, wherein the first component comprises a portion of the actual movement along the lateral axis and the second component comprises a portion of the actual movement along the third vehicle axis.

8. The safety system as recited in claim 1, wherein the at least one sensor includes a first portion detecting movement in along the first sensing axis and a second portion for sensing movement along the second sensing axis transverse to the first sensing axis.

9. The safety system as recited in claim 1, wherein the electronic control unit generates a signal for actuating the safety response to actuate a safety device.

10. The method as recited in claim 4, including determining with the electronic control unit movement along the lateral axis of the vehicle based on the first component and movement along the third vehicle axis based on the second component.

11. The method as recited in claim 4, including sensing along the second sensing axis at an angle greater than 0 degrees and less than 90 degrees from the lateral axis.

12. The method as recited in claim 4, including sensing along the second axis at a 45 degree angle from the lateral axis.

13. The method as recited in claim 10, wherein the electronic control unit generates a signal to initiate the safety response based on movement sensed along the first sensor axis, the first component indicative of movement along the lateral axis and the second component indicative of movement along the third vehicle axis.

* * * * *